United States Patent [19]
Aratani et al.

[11] Patent Number: 5,448,538
[45] Date of Patent: Sep. 5, 1995

[54] ELECTROMAGNET COILS HAVING A DIFFERENT INDUCTANCE DURING MAGNETO-OPTICAL RECORDING AND REPRODUCING

[75] Inventors: Katsuhisa Aratani, Chiba; Tetsuhiro Sakamoto, Tokyo, both of Japan

[73] Assignee: Sony Corporation, Tokyo, Japan

[21] Appl. No.: 267,675

[22] Filed: Jun. 29, 1994

[30] Foreign Application Priority Data

Jul. 7, 1993 [JP] Japan .................................. 5-168124

[51] Int. Cl.$^6$ ............................................ G11B 13/04
[52] U.S. Cl. .................................. 369/13; 360/114
[58] Field of Search ............. 369/13, 14; 360/114, 360/59, 46

[56] References Cited

U.S. PATENT DOCUMENTS

| | | | |
|---|---|---|---|
| 5,157,641 | 10/1992 | Lehureau | 369/13 |
| 5,229,902 | 7/1993 | Zucker et al. | 369/13 |
| 5,313,444 | 5/1994 | Ishii et al. | 369/13 |
| 5,329,408 | 7/1994 | Fuji | 360/114 |
| 5,351,155 | 9/1994 | Ishii | 360/46 |

FOREIGN PATENT DOCUMENTS 5101459  4/1993  Japan .................................. 369/13

*Primary Examiner*—Georgia Y. Epps
*Assistant Examiner*—Tan Dinh
*Attorney, Agent, or Firm*—Hill, Steadman & Simpson

[57] ABSTRACT

In a magneto-optical recording/reproducing apparatus in which a signal is recorded by the magnetic field modulation system and which has a device for applying an external magnetic field at the time of reproduction, the apparatus has an external magnetic field generating electromagnet commonly used for recording and reproducing, the inductance of a coil in the electromagnet at the time of reproduction is larger than the inductance of the coil at the time of recording. In another magneto-optical recording/reproducing apparatus in which a signal is recorded by the magnetic field modulation system and which has a device for applying an external magnetic field at the time of reproduction, the apparatus has an external magnetic field generating electromagnet having an electromagnet coil wound around a magnetic core and commonly used for recording and reproducing, and another external magnetic field generating device capable of being magnetically coupled with the magnetic core of the electromagnet and decoupled therefrom. At the time of recording, a signal is recorded by the magnetic field modulation by energizing the electromagnet while the other external magnetic field generating device is magnetically decoupled from the electromagnet, while at the time of reproduction, the other external magnetic field generating device is magnetically coupled with the electromagnet.

4 Claims, 8 Drawing Sheets

1

1

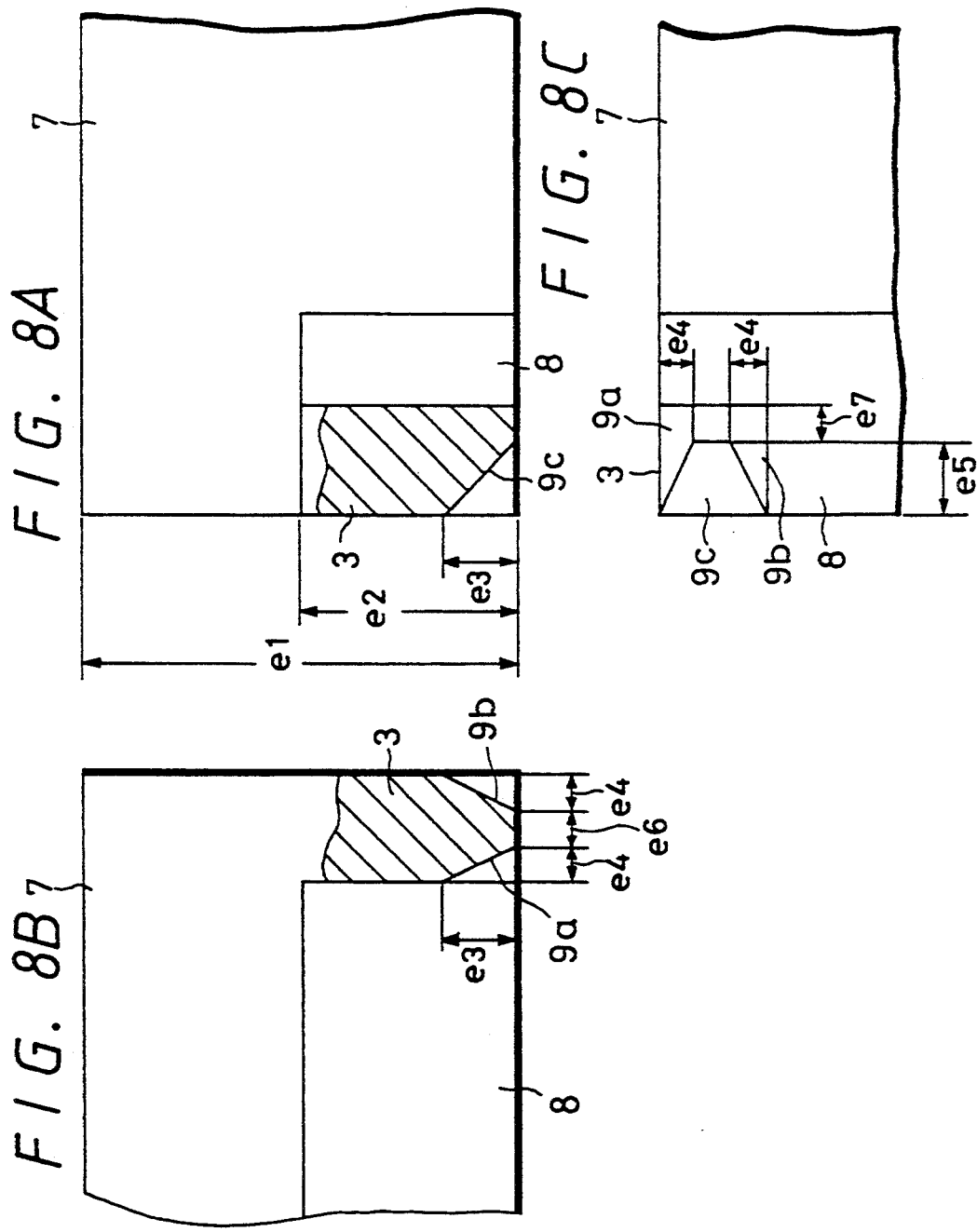

ELECTROMAGNET COILS HAVING A DIFFERENT INDUCTANCE DURING MAGNETO-OPTICAL RECORDING AND REPRODUCING

BACKGROUND OF THE INVENTION

The present invention generally relates to magneto-optical recording/reproducing apparatuses and, more particularly, is directed to a magneto-optical recording-/reproducing apparatus in which a signal is recorded by a magnetic field modulation system and which has an external magnetic field applying unit for applying an external magnetic field at the time of reproduction.

The magneto-optical recording and reproducing method has been proposed in which a laser light is irradiated on a recording medium to locally heat the medium to thereby form an information recording pit, that is, a magnetic domain therein and, the recorded information is read by magneto-optical interaction, that is, the Kerr effect or Faraday effect. According to this method, the size of the recording pit is required to be reduced in order to increase the recording density of the medium. In this respect, resolution of the reproduced information at the time of reproduction is determined on the basis of the wavelength λ of a reproduction light and the numerical aperture N.A. of the objective lens of a reproduction optical system.

There has been made some proposals to improve the resolution of the reproduced information against the aforementioned limitation (hereinafter referred to as "super-resolution") as disclosed in Japanese Laid-Open Patent Publication No. 1-143042 and U.S. Pat. No. 5,218,581. In the proposals, a magneto-optical recording medium having a multilayer film structure constituted by a reproduction or playback layer, an intermediate layer (cutting layer) and a recording layer which are successively and magnetically coupled with one another at room temperature is used in the following manner. That is, upon reproduction, a laser beam serving as the reproduction light beam is irradiated on the recording medium to thereby temporarily extinguish or reduce the size of the magnetic domain in a high temperature portion formed in a laser beam spot but generate a magnetic domain serving as recording information only in a low temperature portion, thereby reading the information therefrom to thereby attain improvement of resolution at the time of reproduction and accordingly attain improvement of recording density.

FIGS. 1A and 1B are explanatory diagrams showing an example of such a magneto-optical recording system. FIG. 1A is a diagram typically showing a reading (reproducing) operation with respect to recording pits $MP_1$, $MP_2$, $MP_3$, ... FIG. 1B is a schematic sectional view of a magneto-optical recording medium 5 used in the system. The magneto-optical recording medium 5 is composed of at least a reproduction layer 51, an intermediate layer 53 and a recording layer 52. As the arrows given to the respective layers typically represent magnetic moments in the respective layers, for example, a downward magnetized condition is given as an initial condition. For example, informations of "0" and "1" are recorded as downward magnetization and upward magnetization respectively at least in the reproduction layer 51 and the recording layer 52. For example, information of "1" is recorded in the form of recording pits (magnetic domain) $MP_1$, $MP_2$, $MP_3$, ...

At the time of reading information from the recording pits, for example, an external magnetic field HR for reproduction (hereinafter referred to as "reproduction magnetic field") is applied in a direction along the direction of magnetization in the initialization or in the "0" recording condition of the reproduction layer 51 in order to attain a good carrier-to-noise ratio (C/N) and, at the same time, the reproduction light beam such as a laser light beam or the like is radiated onto a recording track of the magneto-optical recording medium 5 in which information has been recorded. In FIGS. 1A and 1B, SP represents a spot of the reproduction light beam on the magneto-optical recording medium 5. In this state, when the magneto-optical recording medium 5 moves from the right to the left direction in FIG. 1B as represented by an arrow a, temperature of a portion HT in the left side of the beam spot SP (that is, the front portion of the laser beam as viewed along the running direction of the medium) becomes higher due to the absorption of the reproduction light beam. On the other hand, the magnetic characteristics of the respective layers 51 to 53 of the magneto-optical recording medium 5 are selected so that, due to the high temperature of the portion HT, the coercive force of the reproduction layer 51 is lowered at the high temperature portion HT and that the temperature of the intermediate layer 53 in the high temperature portion HT reaches the Curie point thereof. That is, the recording pit remains as a latent image recording pit $MP_n$ only in the recording layer 52 when the pit is positioned in the high temperature portion HT even if positioned in the spot of the reproduction light, whereas recording pits in the reproduction layer 51 disappear or are extinguished, for example, by the reproduction magnetic field HR. As a result, the area in the reproduction beam spot SP except for the high temperature portion HT is obtained as an area from which recorded information can be read, that is, as a reproduction aperture AP, so that super-resolution in reproduction is thus attained.

The aforementioned super-resolution reproducing system employs such a system that magnetic domains are temporarily extinguished or reduced in the high temperature portion generated in the laser beam spot (hereinafter referred to as "extinction type reproducing system"). As disclosed in U.S. Pat. No. 5,168,482, for example, there has been proposed the so-called transfer type reproducing system in which recording pits in the reproduction layer are extinguished by the external magnetic field for initialization and at the same time the magnetic domain wall in the intermediate layer is extinguished only in the high temperature portion in the reproduction light beam spot to transfer recording pits of the recording layer to the reproduction layer to thereby make it possible to read information from the recording pits transferred onto the reproduction layer.

As a system for recording information, that is, for example, a system for rewriting previously recorded information on a magneto-optical recording medium to which such an extinction type or transfer type super-resolution reproducing system is applied, there has been proposed the so-called light modulation recording system. In the light modulation recording system, recorded information is once erased and then new information is recorded by applying a DC external magnetic field and by locally heating the recording medium by irradiating light beam modulated in accordance with the new information. This recording system, however, has a problem that a large time is required for erasing the recorded information.

As a measure to eliminate such a problem, there is generally known a method, that is, the so-called magnetic field modulation over-write (overlapped writing) method in which a magnetic field is modulated in accordance with information to be recorded at the time of recording.

According to the magnetic field modulation over-write method, laser light is emitted by a DC (direct current) or in synchronism with a signal clock pulse irrespective of the recording signal so that a high temperature portion generated in a medium by the laser light radiation is continuously kept in a recordable state. Under this condition, when an external magnetic field according to the information to be recorded, that is, modulated magnetic field is applied to the portion, new information can be recorded in the high temperature portion irrespective of the previously recorded information.

Accordingly, in the magneto-optical recording/reproducing apparatus using such a super-resolution reproducing system and using the magnetic field modulation system in which a recording medium is subjected to magnetic field modulation, the following arrangement as shown in FIG. 3 is performed. That is, in this arrangement, there is provided an optical pickup PC which irradiates a light beam such as a laser light beam or the like onto a magneto-optical recording medium 5 such as a magneto-optical disk with a predetermined light power at the time of recording and reproduction operation of information respectively. Further, there is provided an external magnetic field electromagnet 1 commonly used for recording and reproduction which applies a required reproduction external magnetic field such as an external magnetic field for initialization to the light beam irradiated portion and applies a modulation magnetic field according to information to be recorded to the portion at the time of recording of the information.

When recording is performed by using the magnetic field modulation system, the electromagnet 1 is required to be formed so that the inductance of a coil therein is set to be in a small value in order to attain good high-frequency response because the frequency used for recording is a high frequency of the order of several MHz.

This magnetic field modulation recording will be considered as follows. Assuming that the angular frequency used for recording is $\omega$ and the number of turns per unit length of the coil is n, the inductance L of the coil is given by $$L = \mu(\omega) l\, Sn^2 \qquad (1)$$

where $\mu(\omega)$ is the permeability of a core material of the electromagnet, S is the sectional area of the coil, and l is the entire length of the coil.

The impedance of the coil is represented by $\omega L$ if the internal resistance thereof can be neglected.

When sinusoidal AC electromotive force E(t) with the recording angular frequency $\omega$ of from the order of several MHz to the order of several tens of MHz is given to the coil, the current I flowing in the coil is given by the following expression (2):

$$I(t) = \frac{E(t)}{j\omega L + r} = \frac{E(t)}{\sqrt{\omega^2 L^2 + r^2}} e^{-j\delta} \qquad (2)$$

where e is natural logarithm, j is imaginary unit, r is the other impedance of a circuit containing the coil, and $\delta$ is a phase lag $\tan^{-1}(\omega L/r)$.

That is to say, with respect to the applied AC electromotive force, the amplitude of the current depends on the angular frequency and the phase of the current lags by $\delta$. Accordingly, when the AC electromotive force E(t) has a rectangular waveform with the frequency $\omega_0$, E(t) is expressed by a Fourier series represented by the following expression (3):

$$E(t) = \begin{bmatrix} -E_0 \left( -\frac{\pi}{\omega_0} \leq t \leq 0 \right) \\ E_0 \left( 0 < t \leq \frac{\pi}{\omega_0} \right) \end{bmatrix} = \qquad (3)$$

$$\sum_{m=0}^{\infty} \frac{-4E_0 j}{(2m+1)\omega_0} e^{j(2m+1)\omega_0 t}$$

$$= \frac{4E_0}{\omega_0} \left( \sin\omega_0 t + \frac{1}{3} \sin 3\omega_0 t + \frac{1}{5} \sin 5\omega_0 + \ldots \right)$$

Therefore, the current I(t) flowing in the coil in accordance with the electromotive force E(t) is represented by the following expression (4):

$$I(t) = \frac{4E_0}{\omega_0} \left( \frac{\sin(\omega_0 t - \delta_1)}{\sqrt{\omega_0^2 L^2 + r^2}} + \right. \qquad (4)$$

$$\left. \frac{\sin(\omega_0 t - \delta_3)}{3\sqrt{9\omega_0^2 L^2 + r^2}} + \frac{\sin(\omega_0 t - \delta_5)}{5\sqrt{25\omega_0^2 L^2 + r^2}} + \ldots \right)$$

where $\delta_n$ satisfies the relation $\delta_n = \tan^{-1}(m\omega_0 L/r)$ (m=1, 3, 5,..).

Accordingly, when $(m\omega_0 L/r)^2$ and $\tan^{-1}(m\omega_0 L/r)$ in the m-order component of I(t) are values which cannot be neglected, both the reduction of the amplitude and the phase lag are conspicuous in the component so that I(t) cannot be obtained as a rectangular wave with the frequency $\omega_0$ because of the distortion of waveform. As a result, recording magnetic field $H(t) = \mu(\omega)nI(t)$ cannot be well obtained. In order to maintain good high-frequency characteristic of H(t), it is necessary that the inductance L of the coil is reduced, that is, the number of turns n in the coil is reduced so that $\omega_0 L$ is smaller relative to r. On the contrary, in order to obtain sufficient reproduction magnetic field at the time of reproduction by using the same electromagnet as used at the time of recording, the stationary current I flowing in the coil must be increased because the value of L is small, that is, because the value of n is small. Accordingly, as long as the same electromagnet is used both at the time of recording and reproduction, electric power consumed at the time of reproduction cannot be saved if magnetic field modulation recording using a high frequency is guaranteed. In view of the specification of the magneto-optical recording medium, it is considered that the time used for reproduction is remarkably longer than the time used for recording. It is therefore very important that electric power consumed at the time of reproduction is saved.

SUMMARY OF THE INVENTION

It is an object of the present invention to provide an improved magneto-optical recording/reproducing apparatus in which the aforementioned shortcomings and disadvantages encountered with the prior art can be eliminated.

More specifically, it is an object of the present invention is to provide a magneto-optical recording/reproducing apparatus using an external magnetic field generating electromagnet commonly used for recording and reproduction and being excellent both in recording characteristic and in saving of consumed electric power, in which signal recording is performed by magnetic modulation and which has an external magnetic field applying unit for applying an external magnetic field at the time of reproduction.

As an aspect of the present invention, there is provided a magneto-optical recording/reproducing apparatus in which a signal is recorded by a magnetic field modulation system and which has an external magnetic field applying unit for applying an external magnetic field at the time of reproduction, and the apparatus is comprised of an external magnetic field generating electromagnet used commonly for recording and reproduction, the electromagnet including an electromagnetic coil unit which is used in a manner that the inductance of the electromagnet coil unit is larger at the time of reproduction than that at the time of recording.

As another aspect of the present invention, there is provided a magneto-optical recording/reproducing apparatus in which a signal is recorded by a magnetic field modulation system and which has an external magnetic field applying unit for applying external magnetic field at the time of reproduction, and the apparatus is comprised of an external magnetic field generating electromagnet used commonly for recording and reproduction, the electromagnet including an electromagnetic coil wound around the same magnetic core, and another external magnetic field generating unit capable of being magnetically coupled with and decoupled from the magnetic core of the electromagnet, whereby at the time of recording, a signal is recorded by the magnetic field modulation by energizing the electromagnet in a manner that the other external magnetic field generating unit is magnetically decoupled from the electromagnet, while, at the time of reproduction, the other external magnetic field generating unit is magnetically coupled with the electromagnet so that an external magnetic field for reproduction is generated from the magnetic core through magnetic field induction caused by the magnetic coupling.

BRIEF DESCRIPTION OF THE DRAWINGS

FIG. 8A is a schematic side view partly in section showing an example of a magnetic core in the external magnetic field generating electromagnet commonly used for recording and reproducing in the magneto-optical recording/reproducing apparatus according to the present invention;

FIG. 8B is a schematic front view partly in section showing the example of the magnetic core in the external magnetic field generating electromagnet shown in FIG. 8A;

FIG. 8C is a schematic bottom view partly in section showing the example of the magnetic core in the external magnetic field generating electromagnet shown in FIG. 8A.

DESCRIPTION OF THE PREFERRED EMBODIMENTS

Prior to the detailed explanation of the preferred embodiments of the present invention, the technical concept of the present invention will be described briefly.

Figure 4:
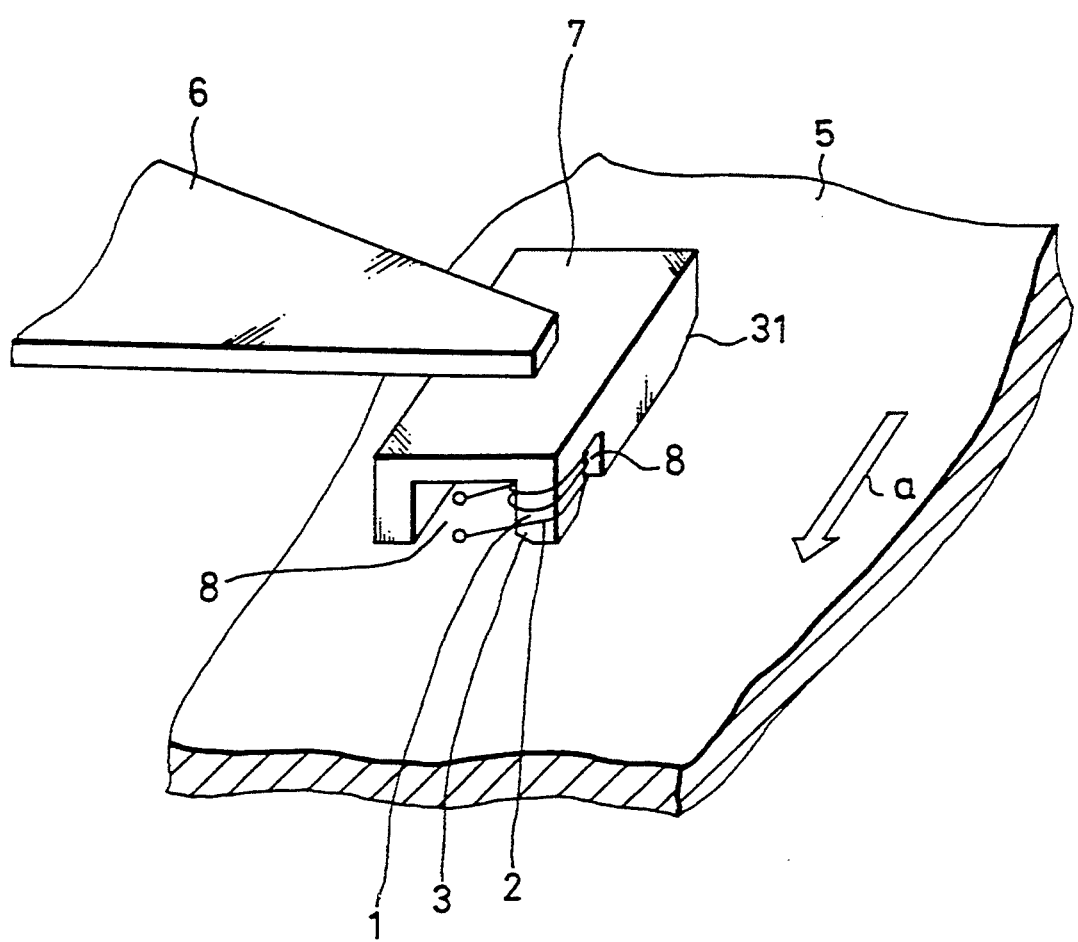
FIG. 4 is a schematic perspective view showing a main part of the magneto-optical recording/reproducing apparatus according to the present invention.

According to the first aspect of the present invention, in the magneto-optical recording/reproducing apparatus in which a signal is recorded by the magnetic field modulation system and which has an external magnetic field applying unit for applying an external magnetic field at the time of reproduction, there is provided an electromagnet 1 for generating external magnetic field which is used commonly for recording and reproduction as shown in FIG. 4 which is a schematic perspective view of a main part of an embodiment of the magneto-optical recording/reproducing apparatus. The electromagnet 1 is used in a manner that the inductance of an electromagnet coil 2 of the electromagnet 1 at the time of reproduction is larger than the inductance of the electromagnet coil 2 at the time of the recording.

Figure 5:
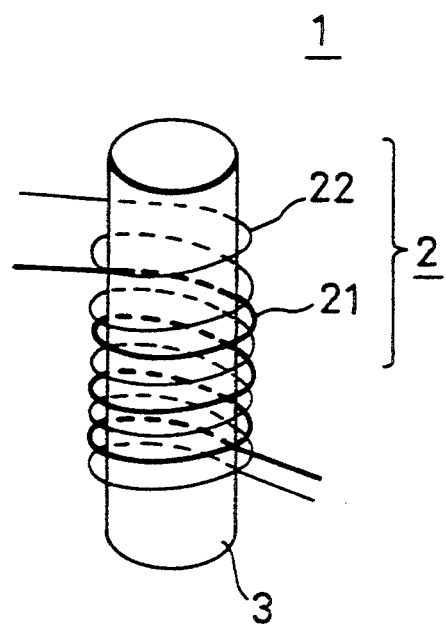
FIG. 5 is a schematic perspective view showing an example of an external magnetic field generating electromagnet commonly used for recording and reproducing in the magneto-optical recording/reproducing apparatus according to the present invention.

According to the second aspect of the present invention, in the aforesaid configuration of the magneto-optical recording/reproducing apparatus, the electromagnet is configured to have two electromagnet coils 21 and 22 which are wound around a single or same magnetic core 3 in a manner that the coils 21 and 22 have different numbers of turns, as shown in FIG. 5 which is a perspective view showing an example of the external magnetic field generating electromagnet. When generating magnetic field, the electromagnet coils 21 and 22 are selectively energized so that one of the coils is used at the time of recording while the other coil is used at the time of reproduction.

Figure 6:
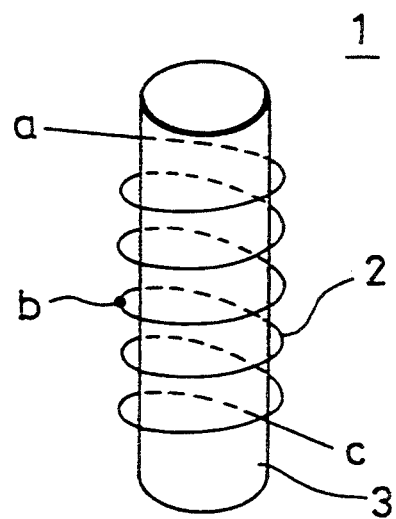
FIG. 6 is a schematic perspective view showing another example of the external magnetic field generating electromagnet commonly used for recording and reproducing.

According to the third aspect of the present invention, in the aforesaid configuration of the magneto-optical recording/reproducing apparatus, the external magnetic field generating electromagnet 1 is provided with an electromagnet coil 2 commonly used for recording and reproduction wound around the same core 3, as shown in FIG. 6 which is a perspective view showing a main part of another example of the external magnetic field generating electromagnet. The magnetic field is generated in a manner that the effective portion or energized portion of the electromagnet coil 2 is differentiated between the recording and reproducing operations.

Figure 7A:
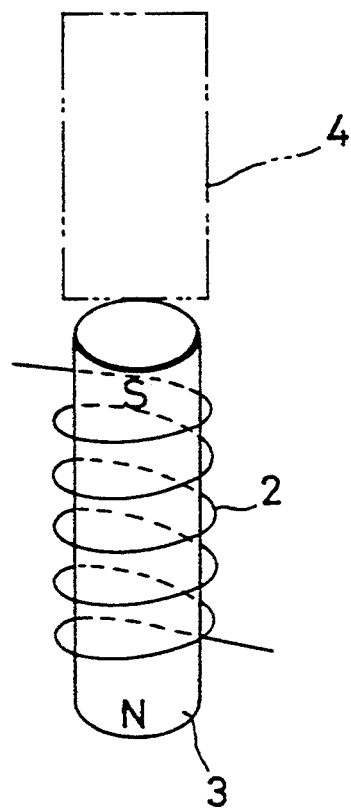
FIG. 7A is a schematic perspective view showing a main part of the magneto-optical recording/reproducing apparatus according to the present invention, used for explaining the recording operation by an external magnetic field generating electromagnet commonly used for recording and reproducing.
Figure 7B:
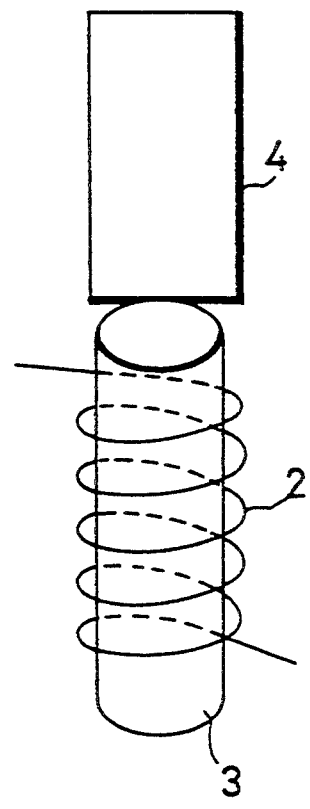
FIG. 7B is a schematic perspective view showing the main part of the magneto-optical recording/reproducing apparatus according to the present invention, used for explaining the reproducing operation by the external magnetic field generating electromagnet commonly used for recording and reproducing.

According to the fourth aspect of the present invention, in the magneto-optical recording/reproducing apparatus in which a signal is recorded by the magnetic field modulation system and which has an external magnetic field applying unit for applying an external magnetic field at the time of reproduction, as shown in FIGS. 7A and 7B which are perspective views showing an main part of another embodiment of the magneto-optical recording/reproducing apparatus, the apparatus has an external magnetic field generating electromagnet 1 which is provided with an electromagnet coil 2 wound around a magnetic core 3 and used commonly for recording and reproduction, and another external magnetic field generating device 4 such as a permanent magnet which is capable of being magnetically coupled with and decoupled from the magnetic core 3 of the electromagnet 1.

As shown in FIG. 7A, at the time of recording, recording is performed by the magnetic field modulation by energizing the electromagnet 1 in a manner that the other external magnetic field generating device 4 is magnetically decoupled from the electromagnet 1. As shown in FIG. 7B, at the time of reproduction, the other external magnetic field generating device 4 is magnetically coupled with the electromagnet 1 so that an external magnetic field for reproduction is generated from the magnetic core 3 of the electromagnet 1 through magnetic field induction while the current supplied to the coil 2 is cut off or reduced.

As described above, according to the first to third aspect of the present invention, the electromagnet 1 is used in a manner that the inductance of the electromagnet coil 2 of the electromagnet 1 at the time of reproduction is larger than the inductance of the electromagnet coil 2 at the time of recording, whereas according to the fourth aspect of the present invention, the external magnetic field applying unit can apply the external magnetic field upon reproduction without depending on the electromagnet. That is, according to the fourth aspect of the present invention, upon recording, the inductance of the electromagnet coil 2 can be reduced to a required minimum value, so that high-frequency recording can be performed in which response of the high-order component is excellent to thereby avoid the generation of distortion such as waveform rounding or the like and so perform good recording, that is, obtain excellent recording characteristic. Further, upon reproduction, since the permanent magnet or electromagnet can be used in a large inductance state thereof, electric power consumed at the time of reproduction can be saved.

The embodiments of the magneto-optical recording/reproducing apparatus according to the present invention will now be described in detail.

As shown in FIG. 4, which is a schematic perspective view of a main part of the first embodiment of the magneto-optical recording/reproducing apparatus according to the present invention, in this embodiment a signal is recorded by the magnetic field modulation system and there is comprised an external magnetic field applying unit for applying an external magnetic field at the time of reproduction, the external magnetic field generating electromagnet 1 commonly used for recording and reproducing is provided so as to oppose to a magneto-optical recording medium 5.

Figures 1A, 1B:
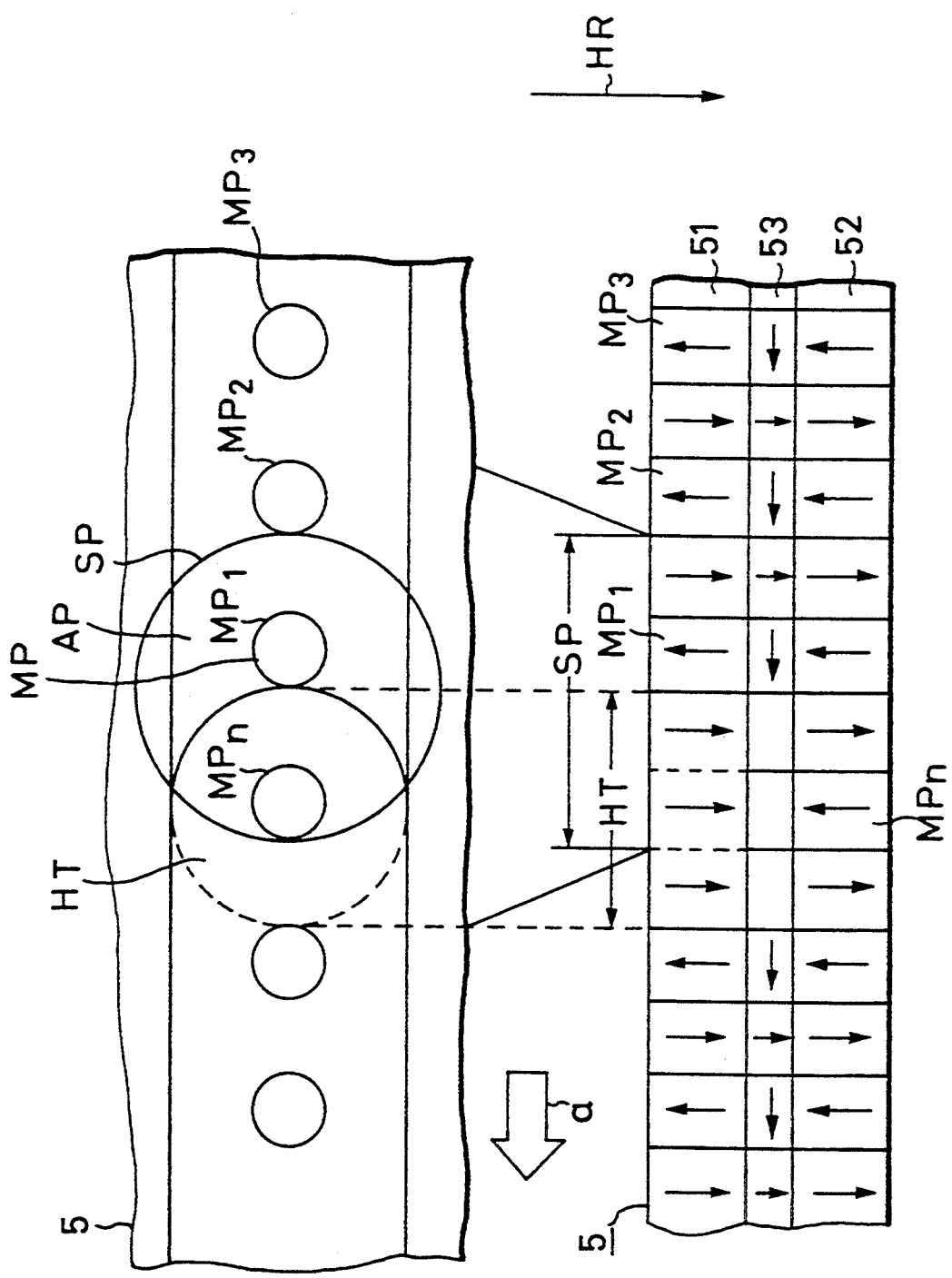
FIG. 1A is a schematic plan view showing a part of a magneto-optical recording medium used for explaining the reproducing operation in a magneto-optical recording/reproducing method.
FIG. 1B is a schematic sectional view showing the magneto-optical recording medium used for explaining the reproducing operation in the magneto-optical recording/reproducing method.

As has been explained with reference to FIGS. 1A and 1B, the magneto-optical recording medium 5 is, for example, a known magneto-optical recording medium of a multilayer structure in which at least the reproduction or playback layer 51 made of a perpendicular magnetization film, the recording layer 52 made of a perpendicular magnetization film and the intermediate layer 53 disposed between the reproduction layer 51 and the recording layer 52 are laminated so that these layers are magnetically coupled with one another at ordinary temperature.

Figure 3:
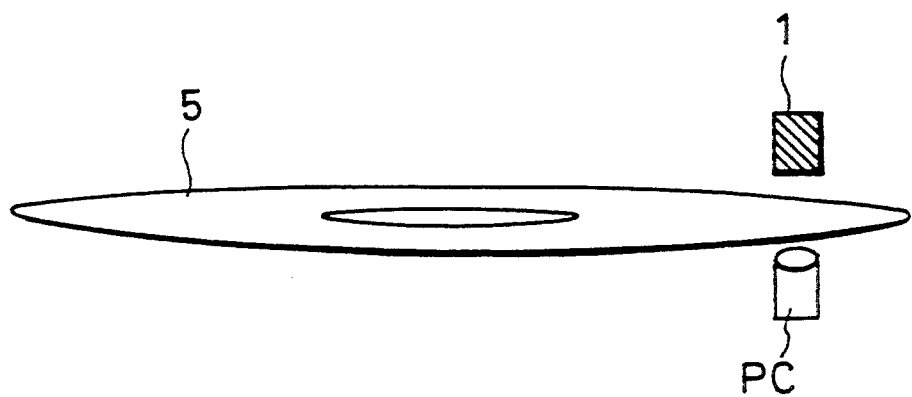
FIG. 3 is a schematic perspective view showing a part of the magneto-optical recording/reproducing apparatus.

As has been explained with reference to FIG. 3, the external magnetic field generating electromagnet 1 commonly used for recording and reproducing is disposed so as to be opposite through the magneto-optical recording medium 5 to the optical pickup PC located in a recording/reproducing position.

The electromagnet 1 is used so that the inductance of the electromagnet coil 2 of the electromagnet 1 at the time of reproduction is larger than the inductance of the electromagnet coil 2 at the time of the recording.

In the embodiment shown in FIG. 4 a floating type magnetic head having the external magnetic field generating electromagnet 1 commonly used for recording and reproducing is employed. In this case, a floating slider 7 is provided at the tip portion of a load beam 6 so that the slider 7 is floated up against the load of the load beam 6 by a flow of air caused by the relative movement of the magneto-optical recording medium 5 such as a magneto-optical disk moved, for example, rotated in the direction of an arrow a.

The floating slider 7 has a taper 31 provided at an end portion of the side thereof from which the magneto-optical recording medium 5 gets under the slider 7. By the generation of the aforementioned air flow and the provision of the taper 31, the slider 7 is floated up by a predetermined distance from the surface of the magneto-optical recording medium 5.

The magnetic field generating electromagnet 1 commonly used for recording and reproducing is provided at a corner of the side opposite to the taper 31 side of the floating slider 7.

That is, the magnetic core 3 is provided so as to project from a surface of this corner of the slider 7 opposing to the magneto-optical recording medium 5. The electromagnet coil 2 is wound around the magnetic core 3.

Referring to FIG. 5 which is a perspective view showing an example of the magnetic field generating electromagnet 1, the electromagnet coil 2 is formed by winding around the magnetic core 3 two electromagnet coils 21 and 22 which are made of the same electrically conductive wiring material but different in the number of turns, that is, different in the value of inductance.

That is, the number of turns of the coil 21 is selected to be smaller than the number of turns of the other coil 22.

At the time of recording, the electromagnet coil 21 smaller in the number of turns and smaller in the value of inductance is used selectively so that recording is performed by the magnetic field modulation. At the time of reproduction, the electromagnet coil 22 is used selectively so that an external magnetic field necessary for reproduction is applied.

According to the aforementioned arrangement, at the time of recording, a high-frequency recording signal based on a signal corresponding to recording information is applied to the coil 21 having a smaller inductance value to generate a recording magnetic field to thereby perform signal recording. Accordingly, excellent recording characteristic can be obtained. At the time of reproduction, an external magnetic field is applied by using the coil 22 having a larger inductance value. Accordingly, electric power consumed at the time of reproduction can be saved.

In the aforementioned arrangement, the floating slider 7 can be formed of a magnetic substance such as an Mn-Zn ferrite or the like. In this case, the magnetic core 3 of the magnetic field generating electromagnet 1 may be formed as a part of the magnetic slider 7.

In this case, the magnetic core 3 may be formed by a groove 8 formed on the bottom surface of the slider 7 at a corner in the side of the slider 7 opposite to the end portion on which the taper 31 is formed. FIGS. 8A, 8B and 8C are side, front (viewed from the end portion opposite to the taper 31 side of the slider 7) and bottom views partly in section of a main part of an example of the slider 7 used in this case.

In this case, the thickness $e_1$ of the slider 7 is, for example, selected to be 3000 μm. The magnetic core 3 having a length $e_2$ of 1500 μm is formed by the groove 8 which is provided by cutting the slider 7 from the bottom thereof by a depth equal to a half of the thickness $e_1$. As shown in FIG. 8B, a first taper 9a and a second taper 9b are formed on the bottom or lower portion of the magnetic core 3 so as to be arranged in opposite sides of the bottom portion in the front view of the magnetic core. Further, as shown in FIGS. 8A and 8C, a third taper 9c is formed on the bottom portion in the front side of the magnetic core 3 so that it tapers toward the bottom end thereof. The height $e_3$ of each of the tapers 9a, 9b and 9c is selected to be 200 μm. The width $e_4$ of each of the tapers 9a and 9b is selected to be 100 μm. The width $e_6$ and depth $e_7$ of the bottom tip portion of the magnetic core 3 and the width $e_5$ of the taper 9c are selected to be 100 μm, 100 μm and 200 μm, respectively.

When a current of 5 AT (ampere turn) is applied to a 60 μm-diameter copper wire wound around the magnetic core 3 selected in the aforementioned size, a magnetic field of about 300 Oe is generated at the bottom tip portion of the magnetic core 3.

Figure 9:
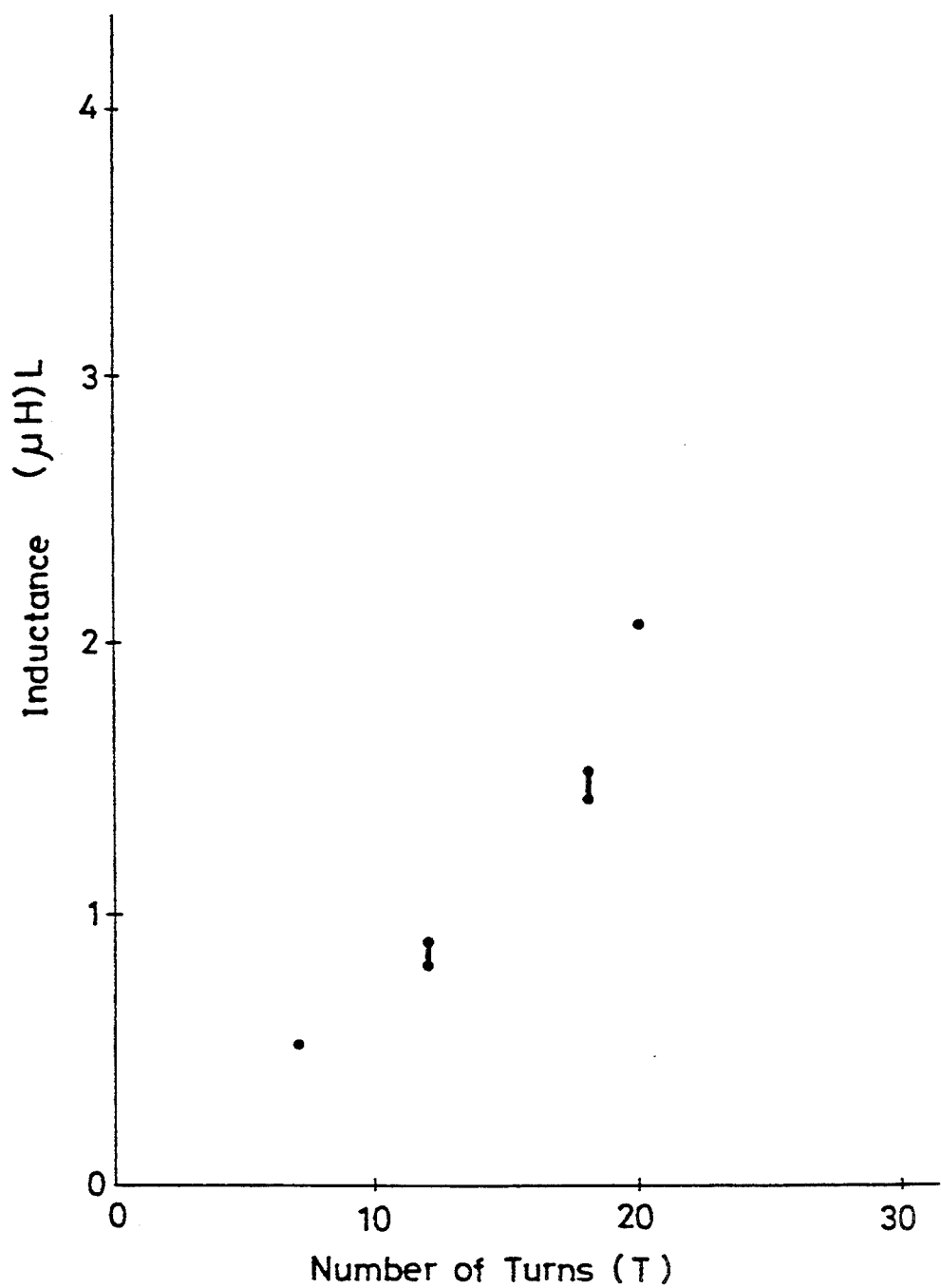
FIG. 9 is a graph showing results of measurement of the relationship between the number of turns and inductance of the coil shown in FIGS. 8A to 8C.

FIG. 9 shows results of measurement of the relationship between the number T of turns and the inductance value L (μH) of the coil 2 when the coil 2 is wound around the magnetic core 3 as shown in FIGS. 8A to 8C. It is apparent from FIG. 9 that the inductance value L is expressed by $L=0.2+4.38\times10^{-3}T^2$ as a function of the second degree with respect to the number T of turns.

Figure 2:
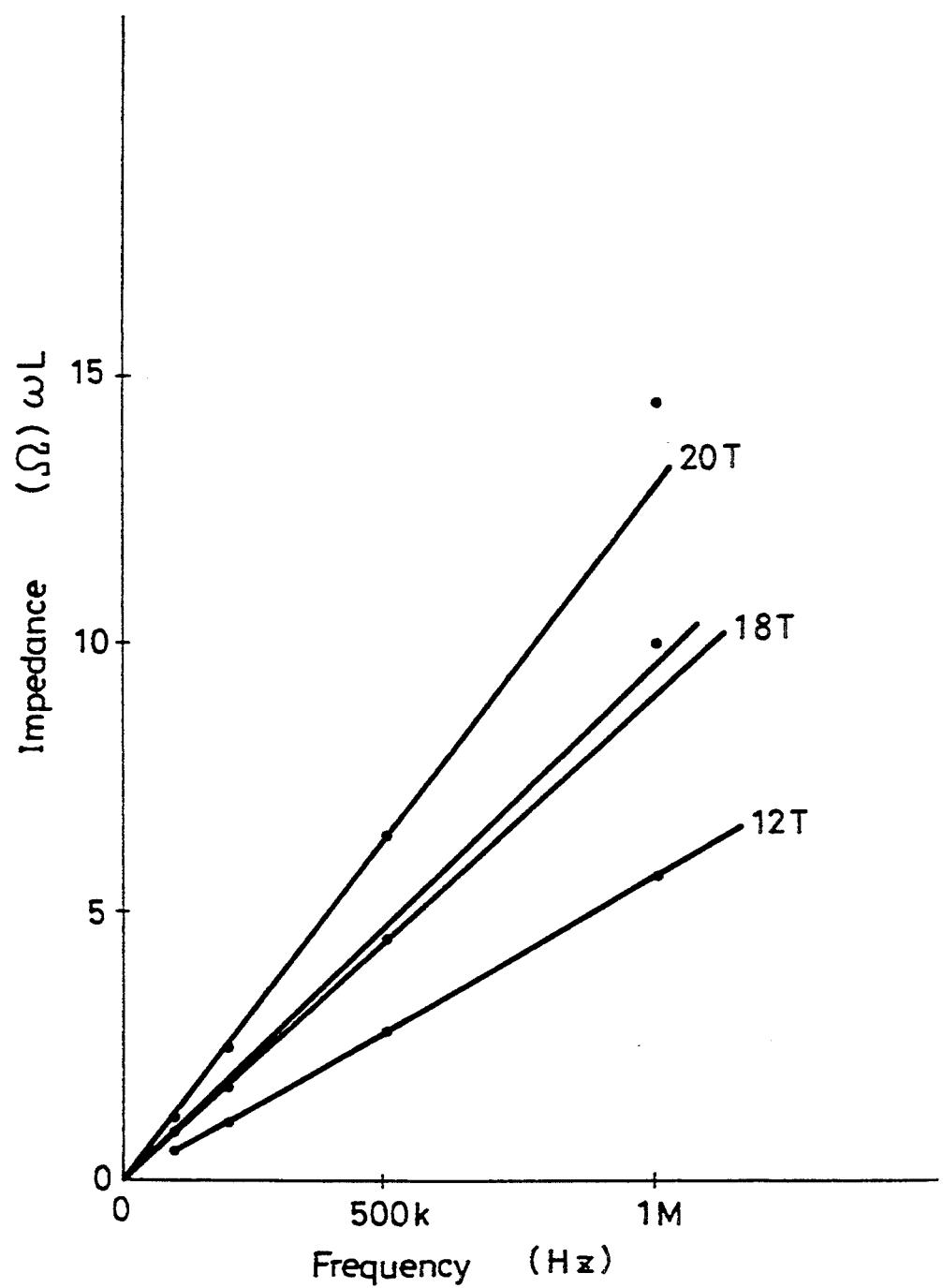
FIG. 2 is a graph showing measured results of impedance of the coils relative to an angular frequency.

FIG. 2 shows the relationship between the angular frequency of external AC electromotive force applied to the coil 2 wound around the magnetic core 3 shown in FIGS. 8A to 8C and the impedance $\omega L$ of the coil in the case where the number T of turns is changed to 20T, 18T and 12T. It is apparent from FIG. 2 that the relationship between angular frequency and impedance in each case of the respective numbers of turns is expressed by a straight line with a slope of inductance L in accordance with the associated number of turns. Assuming now that a magneto-optical disk is provided as a magneto-optical recording medium requiring external magnetic field of 300 Oe at the time of super-resolution reproduction and at the time of magnetic field modulation recording respectively and a magneto-optical recording apparatus is provided to be adapted to the disk and that the magnetic core 3 of the external magnetic field generating electromagnet 1 commonly used for recording and reproducing is configured as shown in FIGS. 8A to 8C, in this case, when AC electromotive force of a rectangular waveform with the frequency of 10 MHz is applied to the coil 2 wound around the magnetic core 3 at the time of recording, the value of inductance becomes small to obtain good magnetic field response when the number of turns of the coil 2 is about 10 T because 300 Oe is required as the external magnetic field.

In order to generate reproduction magnetic field in the case where the number of turns of the coil 2 is about 10 T, however, a current of about 0.5 A is required to flow in the coil 2. On the contrary, if the coils 21 and 22 as shown in FIG. 5 are provided as the coil 2 and the number of turns of the reproduction coil 22 is selected to be, for example, 30 T, the current required for energizing the coil 22 is 0.167 A, so that electric power consumed by a circuit containing the coil can be saved.

Referring to FIG. 6 which is a perspective view showing another example of the external magnetic field generating electromagnet 1, the electromagnet coil 2 commonly used for recording and reproduction is wound around the magnetic core 3.

At the time of recording, while one terminal a of the coil 2 in FIG. 6 is set in a floated sate, a portion between a predetermined midpoint terminal b and the other terminal c of the coil 2, that is, a part of the coil 2 with a small inductance is used so that a modulation magnetic field is generated from the bottom end of the magnetic core 3 by applying a high-frequency modulation current between these terminals b and c in accordance with information to be recorded. As a result, magnetic recording in the magneto-optical recording medium 5 is performed, that is, an information pit (magnetic domain) is formed thereon. At the time of reproduction, a predetermined current is applied between the two terminals a and c of the coil 2, that is, the coil 2 with a large impedance is used. In other words, the effective portion of the electromagnet coil 2 upon reproduction is changed from the effective portion thereof used at the time of recording to thereby generate different intensities of magnetic fields between the recording and reproducing operations.

FIGS. 7A and 7B are perspective views showing a main part of the between embodiment of the apparatus according to the present invention. As shown in FIGS. 7A and 7B, in this embodiment, there are provided an external magnetic field generating electromagnet 1 commonly used for recording and reproducing and having an electromagnet coil 2 wound around a magnetic core 3, and a permanent magnet serving as an external magnetic field generating device 4 which is movable so that the device 4 can be magnetically coupled with the magnetic core 3 of the electromagnet 1 and can be magnetically decoupled therefrom.

As shown in FIG. 7A, at the time of recording, the magnetic field modulation recording is performed by the electromagnet 1 in a manner that the other external magnetic field generating device 4 is magnetically decoupled from the electromagnet 1. As shown in FIG. 7B, at the time of reproduction, the external magnetic field generating device 4, that is, the permanent magnet is magnetically coupled with the magnetic core 3 of the electromagnet 1 so that magnetic field is induced in the magnetic core 3 by the device 4 while the current supply to the coil 2 is cut off. As a result, a predetermined external magnetic field for reproduction is applied to the recording medium.

In this case, since no current is supplied to the coil 2 at the time of reproduction, electric power consumed by the coil 2 is zero.

While the present invention is applied to the magneto-optical recording medium 5 having the structure in which at least the reproduction layer 51, the recording layer 52 and the intermediate layer 53 are laminated, it will be readily apparent by those of ordinary skill in the art that the structure of each of the layers is not limited to the single layer structure shown in the drawings and that various changes and modifications may be made. For example, each of the layers may have a multilayer structure in which an auxiliary layer is provided so as to satisfy required characteristic and so on.

As described above, according to the present invention, the electromagnet is used in a manner that the value of inductance in the electromagnet coil of the electromagnet at the time of reproduction is larger than the value of inductance in the electromagnet coil at the time of recording. Accordingly, at the time of recording, the value of inductance in the electromagnet coil can be reduced to a required minimum, so that good high-frequency recording excellent in response of the high-order component can be performed while generation of distortion such as waveform rounding is avoided, that is, excellent recording characteristic can be obtained. On the other hand, at the time of reproduction, the electromagnet can be used in a large inductance state thereof, so that electric power consumed by the electromagnet can be saved.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A magneto-optical recording/reproducing apparatus in which a signal is recorded by a magnetic field modulation system and which has an external magnetic field applying means for applying an external magnetic field at the time of reproduction, said apparatus comprising an external magnetic field generating electromagnet used commonly for recording and reproduction, said electromagnet including an electromagnetic coil means and means for making the inductance of said electromagnet coil means larger at the time of reproduction than that at the time of recording.

2. A magneto-optical recording/reproducing apparatus according to claim 1, wherein said electromagnetic coil means includes first and second electromagnet coils wound around a magnetic core, said first and second electromagnetic coils being different from each other in the number of turns, and wherein one of said first and second electromagnet coils is selectively used so that different electromagnetic coils are used between at the time of recording and at the time of reproduction.

3. A magneto-optical recording/reproducing apparatus according to claim 1, wherein said electromagnetic coil means includes a common electromagnet coil wound around a magnetic core, and wherein a magnetic filed is generated in a manner that an effective portion of said electromagnet coil is changed between at the time of recording and at the time of reproduction.

4. A magneto-optical recording/reproducing apparatus in which a signal is recorded by a magnetic field modulation system and which has an external magnetic field applying means for applying an external magnetic field at the time of reproduction, said apparatus comprising:

an external magnetic field generating electromagnet used commonly for recording and reproduction, said electromagnet including an electromagnetic coil wound around a magnetic core; and a second external magnetic field generating means capable of being magnetically coupled with and decoupled from said magnetic core of said electromagnet, whereby at the time of recording, a signal is recorded by the magnetic field modulation by energizing said electromagnet in a manner that said second external magnetic field generating means is magnetically decoupled from said electromagnet, while, at the time of reproduction, said second external magnetic field generating means is magnetically coupled with said electromagnet so that an external magnetic field for reproduction is generated from said magnetic core through magnetic field induction caused by the magnetic coupling.

* * * * *